United States Patent [19]

Fichlseder et al.

[11] Patent Number: 4,880,587
[45] Date of Patent: Nov. 14, 1989

[54] PROCESS FOR PRODUCTION OF AN INJECTED MOLDED PART

[75] Inventors: Martin Fichlseder, Ottenberg; Ingo Preuss, Munich, both of Fed. Rep. of Germany

[73] Assignee: Krauss-Maffei A.G., Munich, Fed. Rep. of Germany

[21] Appl. No.: 143,183

[22] Filed: Jan. 13, 1988

Related U.S. Application Data

[62] Division of Ser. No. 889,249, Jul. 25, 1986, Pat. No. 4,738,613.

[30] Foreign Application Priority Data

Jul. 25, 1985 [DE] Fed. Rep. of Germany ....... 3526632

[51] Int. Cl.⁴ .............................................. B29C 45/44
[52] U.S. Cl. .................................... 264/154; 264/161; 264/328.9; 264/334; 425/436 RM; 425/810
[58] Field of Search ...................... 425/450.1, 554, 556, 425/563, 574, 575, 577, 810, DIG. 10, DIG. 51, DIG. 54, DIG. 58, 436 R, 436 RM, 441, 443, 444; 264/106, 107, 328.9, 334, 161, 328.1, 328.7, 328.11, 154, 155

[56] References Cited

U.S. PATENT DOCUMENTS

| | | | |
|---|---|---|---|
| 2,994,921 | 8/1961 | Hultgren | 425/556 |
| 3,013,303 | 12/1961 | Amazon . | |
| 4,185,955 | 1/1980 | Holmes et al. | 425/568 |
| 4,260,360 | 4/1981 | Holmes et al. | 425/548 |
| 4,404,160 | 9/1983 | Bonissone et al. | 425/566 |

FOREIGN PATENT DOCUMENTS

| | | |
|---|---|---|
| 76589/81 | 6/1981 | Australia . |
| 76590/81 | 9/1981 | Australia . |
| 76591/81 | 10/1981 | Australia . |
| 2838634 | 5/1979 | Fed. Rep. of Germany . |
| 55-15834 | 2/1980 | Japan ..................................... 425/556 |
| 60-9721A | 1/1985 | Japan . |
| 2074807 | 10/1981 | United Kingdom . |

Primary Examiner—Jan H. Silbaugh
Assistant Examiner—Jill L. Heitbrink
Attorney, Agent, or Firm—Robert J. Koch

[57] ABSTRACT

An injection molded part of thermoplastic material, in particular an information carrier disk, is produced by cutting and removal of a sprue part from the injection molded part. The sprue removal leaves an opening in the injection molded part. In order to obtain a clean and smooth opening surface with a fit diameter that is as accurate as possible, the sprue part is axially offset relative to the injection molded part so that the integral connection between these two parts extends only over a part of the opening. The diameter of the axially projecting part is equal to or larger than the diameter of the opening and the rest of the opening being produced by injection molding. The dimensions are advantageously chosen so that a parting edge inclined at an angle of 45° to the plane of the opening is formed and that the injection molded part amounts to 70% and the part to be separated to 30% of the length of the opening. The injection molded length of the opening may also be variable. The sprue part may be cut from the injection molded part and removed, either in the closed or open state of the injection molding tool.

6 Claims, 4 Drawing Sheets

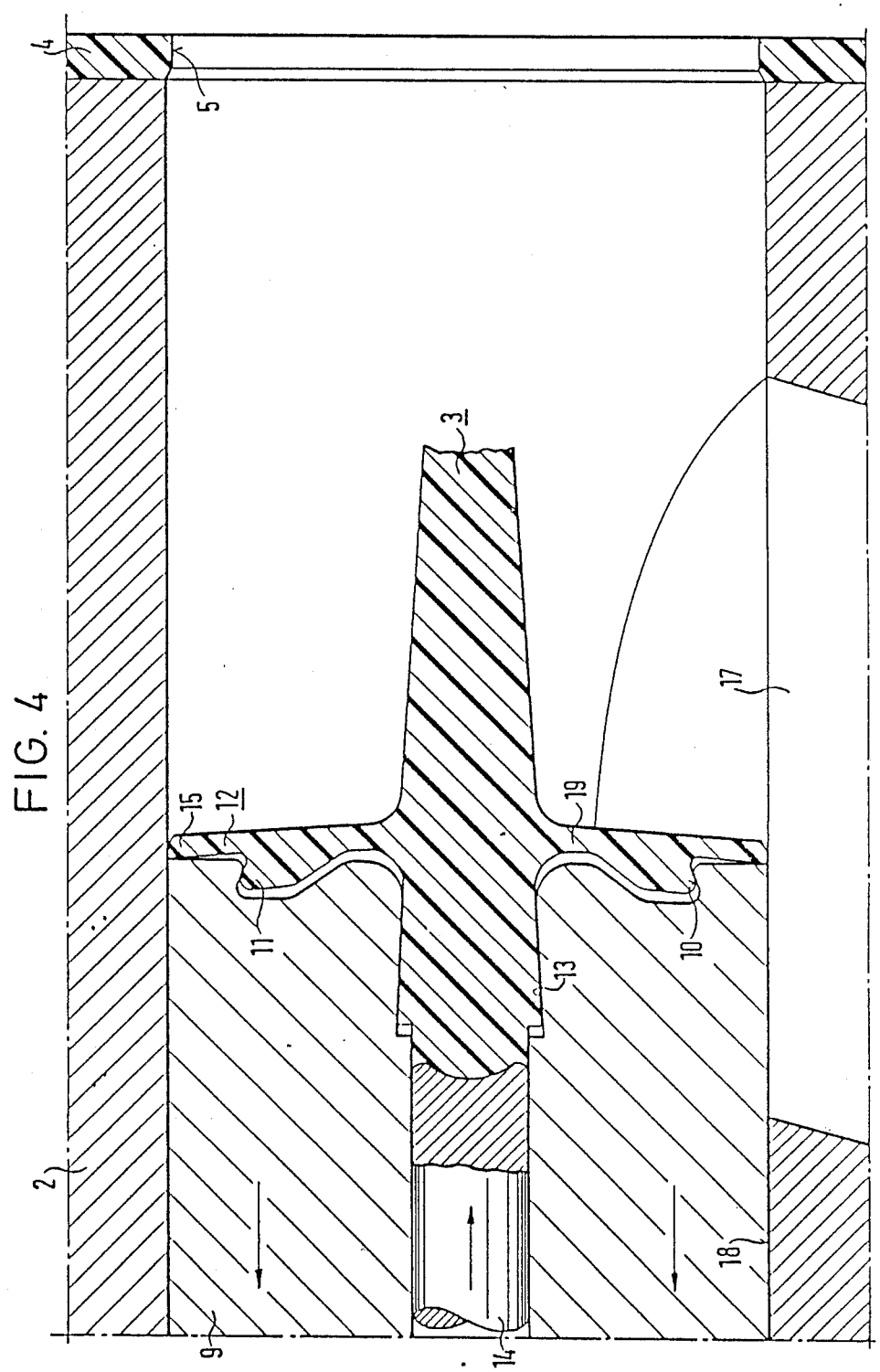

PROCESS FOR PRODUCTION OF AN INJECTED MOLDED PART

This is a divisional of application Ser. No. 889,249 filed July 25, 1986, now U.S. Pat. No. 4,738,613, issued Apr. 19, 1988.

BACKGROUND OF THE INVENTION

1. Field of the Invention

The invention relates to a process and an apparatus for the production of an injection molded part, in particular an apertured information carrier disk.

2. Description of the Related Technology

The sprue funnel serves, by virtue of its specific configuration, to introduce liquified plastic material arriving from the channel of the injection molding nozzle into the mold cavity. The sprue funnel effects a uniform distribution around the circumference and diverts the plastic material by 90°. The sprue part formed in the course of the injection molding process in the sprue cavity must be cut and removed from the molding after the cooling phase.

DE-OS No. 28 38 634 shows a device to cut the sprue part, which is integrally joined to the molding, by punching and ejecting the sprue by a sprue ejector in the production of an annular molding by an injection molding process. The two-part injection mold is opened by displacing both parts of the mold axially from each other to punch out the sprue part. The separation of the two mold parts is effected in two steps, i.e., initially only far enough so that the sprue part which is held in an undercut is punched into the free space created in this manner by a hydraulically actuated tubular ejector, wherein the sprue is still held by the undercut. Subsequently, the mold is opened completely and the sprue part pushed out of the undercut by an ejector pin guided in the tubular ejector, so that it drops downward in the parting plane of the injection molding tool.

Precision and freedom of dust requirements are extremely high in information carrier disks, such as sound and image carrier disks produced by an injection molding process. Particular problems arise in the creation of a center opening by the punching of the sprue part from the disk, as shown in DE-OS No. 28 38 634.

The tolerance limits of the fit diameter of the opening are larger than those of the other dimensions of the disk due to the punching process. The surface of the punched opening is also rougher than those of the rest of the injection molded surface of the disk. The dust particles necessarily produced in the process may affect the molded article. In the course of the production of information carrier disks dust may be deposited on the die plate used in the process, which would be embedded in the product in the next molding step.

A disk produced with embedded dust would exhibit impaired reproduction quality, possibly rendering the disk unusable. The punching process further generates stresses which my have a detrimental effect on the product.

SUMMARY OF THE INVENTION

It is an object of the invention to shape the opening produced by an injection molding tool in an injection molded part, in particular an information carrier disk, made with a sprue, from which the sprue part is subsequently removed thereby creating said opening. The opening is produced to exhibit a fit diameter with an optimum of precision with narrow tolerance limits. The opening surface is of high quality and the stresses prevailing in the area of the opening are as low as possible.

This object is attained in a process for the production of an injection molded part of a thermoplastic material, in particular an information carrier disk, by means of an essentially two-part injection molding tool, with a mold cavity to receive and a sprue funnel for the pouring of an injection molded part. The injection molded part is integrally joined to a sprue part. After the injection molding and cooling process, an appropriate opening is produced in said injection molded part by subsequent separation of the sprue part from the injection molded part. In the process the sprue part is axially offset relative to the injection molded part to the extent that an integral connection between the two parts extends only over a part of the axial length of the opening. The diameter of the axially projecting part of the sprue part is conveniently equal to or larger than the diameter of the opening and the remaining part of the opening is made by injection molding. In the process a major portion of the opening length or surface is produced by the injection molding method and defined by the mold parts. An accurate fit diameter with a high surface quality is thereby obtained. The connecting area between the injection molded part and the sprue part may be chosen to be small enough so that the cross section of the passage is just adequate for flow of the liquified plastic material and the parting edge will not interfere with the fit diameter.

In an advantageous embodiment of the invention the axial offset and the diameter of the projecting part of the sprue part are chosen so that upon cutting or separating the sprue part from the injection molded part a parting edge inclined at an angle of 45° to the plane of the opening is formed and/or the injection molded portion amounts to 70%, and the part to be removed to 30%, of the axial length of the opening of molded part.

An advantageous apparatus for the molding process includes a stationary half and an axially displaceable half with a bushing arranged inside the stationary half. The bushing comprises an internal sprue funnel and has an external diameter which correspond to the contour of the opening. The front edge of the bushing extends axially over or past the frontal edge of the stationary half. A sleeve with a conical narrowing forming an undercut in the flange of the sprue part and a further narrowing for the centered holding of the sprue part is provided inside the displaceable half. The internal diameter of the displaceable half corresponds to the diameter of an axially projecting part of the sprue part. An axially displaceable ejector for the ejection of the sprue part is guided in the sleeve. According to this embodiment the sprue part may be cut and removed from the injection molded part either in the open or closed state of the injection molding tool. The sprue part is separated from the injection molded part by a sleeve with the conical narrowing moved away from the injection molded part while entraining the ejector and the sprue part, which is resting against the injection molding tool, is moved along by the undercut formed in the flange of the sprue part. The sprue may be removed with the tool open or closed. In the latter case, the injection molded part is held securely by its integral joint with the sprue part, until the latter is removed, so that no special holding means, such as an undercut on the injection molded part, are required.

The sprue part itself is also held securely until the completion of the ejection process by the continuing narrowing toward the center sprue receptacle.

The result of the elimination of the punching process is that no punching edge wear and dust formation is largely avoided. Furthermore, the absence of a punching die leaves more space for cooling in the area of the injection nozzle and the sprue part.

The larger size of the diameter of the moving half compared with the stationary half of the injection molding tool where the internal diameter of the displaceable half is larger than the external diameter of the bushing results in an advantageous inclination of the parting edge, where the axial offset and the diameter of the projecting part of the sprue part are chosen so that during the separation of the sprue part from the injection molded part a parting edge inclined at an angle of 45° to the plane of the opening is formed.

In an advantageous embodiment the bushing arranged within the stationary half of the injection molding tool has an outer diameter which corresponds to the contour of the opening and is axially displaceable and retainable. The injection molded opening length may be varied by axial displacement of the bushing, as for example, where the injection molded part amounts to approximately 70% and the part to be separated to approximately 30% of the axial length of the part opening.

The arrangement of the bushing in an axially displaceable fashion enables its use as a pressure piston in order to press the sprue part from the injection molded part.

The drawings show an exemplary embodiment of the invention.

BRIEF DESCRIPTION OF THE DRAWINGS

In the drawings:

FIG. 4 shows the axially displaceable left hand part of the injection molding tool with the sprue part cut, immediately prior to ejection.

DETAILED DESCRIPTION OF THE PREFERRED EMBODIMENT

Figure 1:
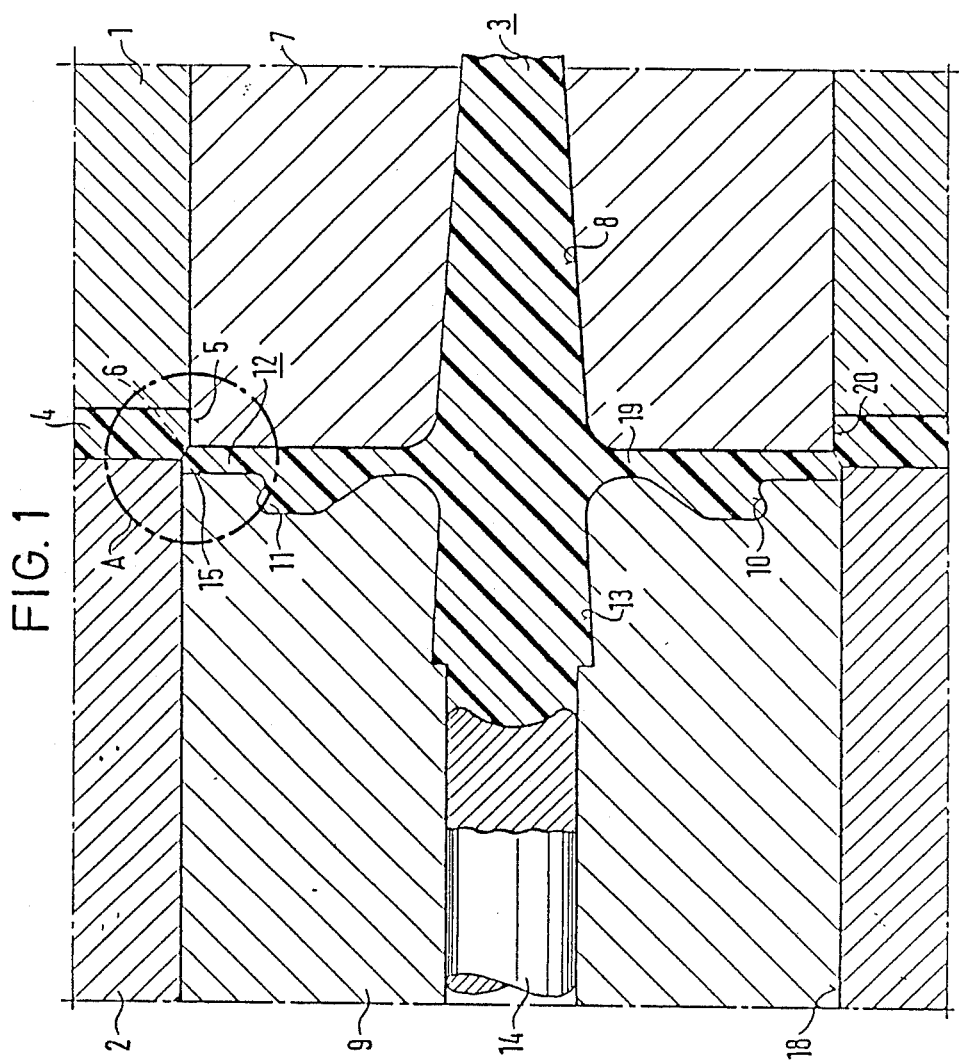
FIG. 1 shows a longitudinal section through an injection molding tool with an injection molded part and a sprue part.

The injection molding tool shown as a segment in FIG. 1 includes a stationary half 1 and an axially displaceable half 2 with an internal diameter or surface 18. A cavity is formed between the two halves filled with a sprue part 3 with a flange 12 and an injection molded or product part 4 with an opening 5. The sprue part and the product part are integrally joined together as a result of the injection molding process at a connecting location 6.

An axially displaceable and retainable bushing 7 with an external diameter or surface 20 is arranged within the stationary half 1. It includes an integral sprue funnel 8. Its outer diameter 20 corresponds to the contour of the opening 5 in the injection molded part 4.

Figure 2:
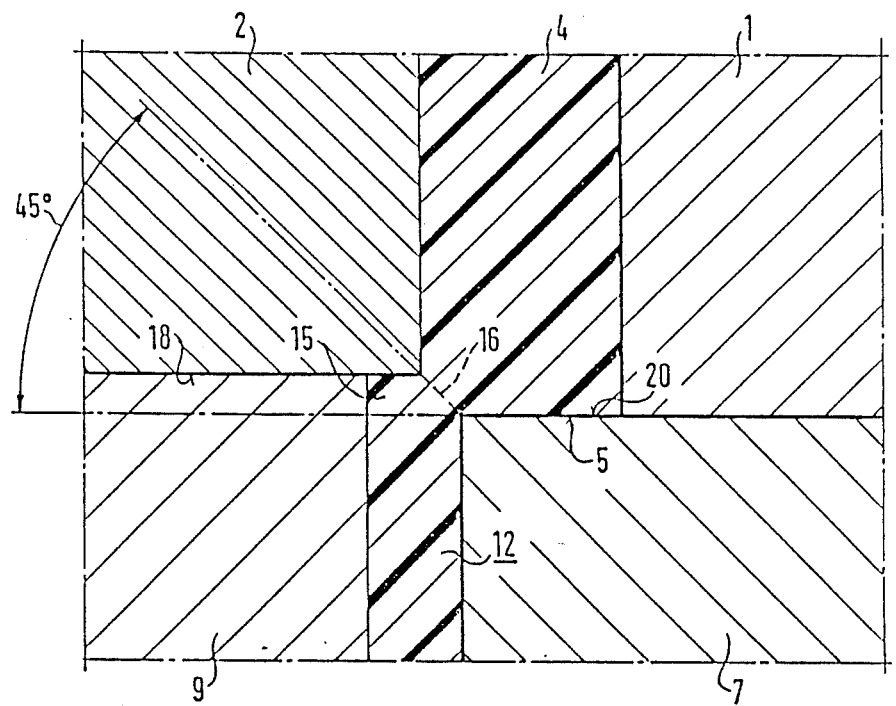
FIG. 2 shows a segment A according to FIG. 1, enlarged.

An axially movable sleeve 9 with a conical narrowing 10 provided to form an undercut 11 in the flange 12 of the sprue part 3 and with a further narrowing 13 for centered holding of the sprue part 3 is located within the displaceable half 2. An axially displaceable ejector 14 is guided in the sleeve 9 for the ejection of the sprue part 3. The internal diameter 18 of the moving half 2 is larger than the external diameter 20 of the bushing 7 and corresponds to the diameter of an axially projecting part 15 of the flange 12 of the sprue part 3. As seen in particular in the enlarged view illustrated by FIG. 2, a parting edge 16 is inclined at a 45° angle relative to the plane of the opening 5.

Figure 3:
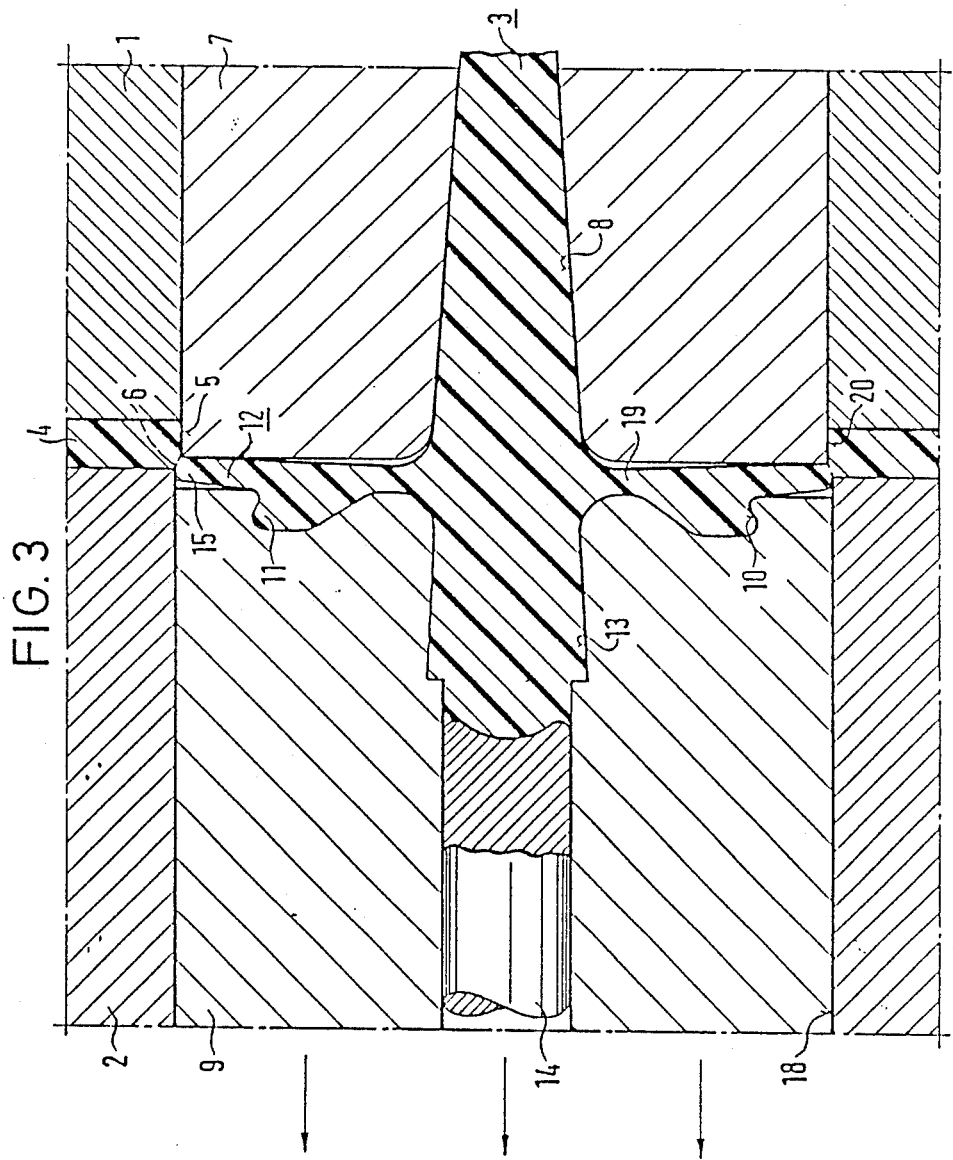
FIG. 3 shows a sectional view according to claim 1, illustrating the cutting of the sprue part from the injection molded part.

Following the completion of the injection molding process, the sleeve 9 is moved to the left in the direction of the arrow in FIG. 3. The sprue part 3 is taken along. Due to the adherence of the sprue part 3 to the injection molded part 4, the flange 12 of the sprue part 3 initially undergoes bending stress. The sprue part 3 is held securely by the sleeve 9 as undercut 11 is pressed into the conical narrowing 10. Upon further displacement of the sleeve 9 in the direction of the arrow, the sprue part 3 is separated from the injection molded part 4 at the connecting location 6 along the parting edge 16. According to FIG. 4, the sleeve 9 is further displaced inside the movable half 2 in the direction of the arrow, into the area of an opening 17. The ejector 14 is now displaced in the direction of the arrow to the right and the sprue part is thereby ejected from the narrowings 10 and 13 of the sleeve 9, so that it can drop through the opening 17 from the injection molding tool. The narrowing 13 is in contact longer than the narrowing 10, so that the sprue part 3 is held securely in the sleeve 9 until the ejection process is completed.

The ejection of the sprue part 3 is facilitated by bending of the flange 12 resulting from the centered force introduced by the ejector 14, as seen in FIG. 4. Pressure on the undercut 11 of the sprue part 3 is thereby relieved and the ejection of said sprue part facilitated without the generation of harmful dust by the abrasion of the plastic at the undercut.

In this manner the angle of the undercut may be made larger than usual. The ejection of the sprue part is additionally facilitated by the cooling shrinkage.

The ease of removal of the sprue part 3 is enhanced by the contraction 19 in the flange 12 at its neck on the sprue part. Due to the configuration of the contraction the elasticity of the flange is increased.

The injection molded part 4, which is seated with opening 5 on the bushing 7, may be removed upon simultaneous or subsequent opening of the injection molding tool in which the displaceable half 2 is moved to the left in the direction of the arrow. The injection molded part 4 is thereby released. The removal of the part may be accomplished automatically preferably by means of an appropriate device, not shown. The next injection process may be carried out following the closing of the tool.

Alternatively, the sprue part and the injection molded part may also be removed by moving the displaceable half 2 of the tool, the sleeve 9, and the ejector 14, together with the sprue part 3, and the injection molded part 4 to the left in the direction of the arrow. In this case the injection molded part 4 is held by the sprue part 3 and integrally joined therewith.

An automatic discharging device, not shown, now grips and immobilizes the injection molded part and releases the movement to separate the sprue part from the injection molded part, as described above.

When the sprue part 3 has been separated from the injection molded part 4, the discharging device carries out an axial motion in the direction of the stationary half 1. Subsequently, it swivels out around a point of rotation with the injection molded part 4 from the area of the tool. As the movement around the swivelling point takes place outside the tool areas, only a small opening path of the tool is required to remove the injection molded part 4.

We claim:

1. A method for producing apertured injection molded parts utilizing an injection molding tool having a center busing arranged within a stationary half partially defined a mold cavity and an axially aligned sleeve arranged within a displaceable half partially defining said mold cavity comprising the steps of:

closing the injection molding tool so that the center bushing and the sleeve define a sprue cavity integral to said mold cavity defined by said stationary half and said displaceable half, said sprue cavity is offset along an axis and integral with said mold cavity;

injecting material into said mold cavity through a sprue funnel defined by said bushing and said sprue cavity;

separating a sprue internally formed with a molded part and joined to said molded part at an aperture partially defined by an extension of said bushing past said stationary half by axial retraction of said sleeve.

2. A method as in claim 1 further comprising the step of holding a sprue to said sleeve by a central axial narrowing and a sprue flange undercut in said sleeve during said separating step.

3. A method as in claim 2, wherein the step of separating further comprises axial advancement of said bushing.

4. A method as in claim 2, further comprising the step of ejecting said sprue following said step of separating.

5. A method as in claim 1, wherein said step of closing includes arranging said bushing so as to extend past said stationary half by a distance equalling at least 70% of an axial width exhibited by the mold cavity.

6. A method as in claim 1, wherein said step of separating forms a 45° angle parting edge in a molded part.

* * * * *

UNITED STATES PATENT AND TRADEMARK OFFICE
CERTIFICATE OF CORRECTION

PATENT NO. : 4,880,587

DATED : Nov. 14, 1989

INVENTOR(S) : Eichlseder et al

It is certified that error appears in the above-identified patent and that said Letters Patent is hereby corrected as shown below:

On the title page:

Inventors: Martin Eichlseder, Ottenberg; Ingo Preuss, Munich, both of Fed. Rep. of Germany Signed and Sealed this Ninth Day of October, 1990

Attest:

HARRY F. MANBECK, JR.

*Attesting Officer*  *Commissioner of Patents and Trademarks*